(12) United States Patent
Kinjo

(10) Patent No.: US 7,106,887 B2
(45) Date of Patent: Sep. 12, 2006

(54) IMAGE PROCESSING METHOD USING CONDITIONS CORRESPONDING TO AN IDENTIFIED PERSON

(75) Inventor: Naoto Kinjo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 676 days.

(21) Appl. No.: 09/833,784

(22) Filed: Apr. 13, 2001

(65) Prior Publication Data

US 2002/0015514 A1   Feb. 7, 2002

(30) Foreign Application Priority Data

Apr. 13, 2000   (JP)   ............... 2000-112134
Jun. 15, 2000   (JP)   ............... 2000-179580

(51) Int. Cl.
  *G06K 9/00*   (2006.01)
(52) U.S. Cl. ............... 382/118; 382/167; 382/274
(58) Field of Classification Search ............... 382/118
  See application file for complete search history.

(56) References Cited

U.S. PATENT DOCUMENTS

| | | | | |
|---|---|---|---|---|
| 5,202,934 | A * | 4/1993 | Miyakawa et al. | 382/319 |
| 5,276,511 | A * | 1/1994 | Takemoto | 358/527 |
| 5,278,921 | A | 1/1994 | Nakamura et al. | |
| 5,629,752 | A * | 5/1997 | Kinjo | 355/35 |
| 5,907,391 | A * | 5/1999 | Kobayashi et al. | 355/40 |
| 5,930,391 | A * | 7/1999 | Kinjo | 382/173 |
| 5,978,100 | A * | 11/1999 | Kinjo | 358/453 |
| 6,011,547 | A * | 1/2000 | Shiota et al. | 382/254 |
| 6,034,759 | A * | 3/2000 | Enomoto | 355/41 |
| 6,097,470 | A * | 8/2000 | Buhr et al. | 355/38 |
| 6,123,362 | A * | 9/2000 | Squilla et al. | 283/67 |
| 6,148,108 | A * | 11/2000 | Nishikawa | 382/236 |
| 6,259,824 | B1 * | 7/2001 | Sekiya | 382/274 |
| 6,282,330 | B1 * | 8/2001 | Yokota et al. | 382/309 |
| 6,344,858 | B1 * | 2/2002 | Vuylsteke et al. | 345/660 |
| 6,385,346 | B1 * | 5/2002 | Gillihan et al. | 382/254 |
| 6,396,963 | B1 * | 5/2002 | Shaffer et al. | 382/305 |
| 6,445,819 | B1 * | 9/2002 | Kinjo | 382/173 |
| 6,529,630 | B1 * | 3/2003 | Kinjo | 382/190 |
| 6,560,374 | B1 * | 5/2003 | Enomoto | 382/284 |
| 6,577,761 | B1 * | 6/2003 | Kanno et al. | 382/167 |
| 6,608,644 | B1 * | 8/2003 | Kondo et al. | 348/14.09 |
| 6,618,512 | B1 * | 9/2003 | Yamaguchi | 382/319 |
| 6,650,435 | B1 * | 11/2003 | Ikeda | 358/1.9 |
| 6,677,969 | B1 * | 1/2004 | Hongo | 715/863 |
| 6,678,407 | B1 * | 1/2004 | Tajima | 382/167 |
| 6,701,011 | B1 * | 3/2004 | Nakajima | 382/167 |
| 6,728,428 | B1 * | 4/2004 | Kinjo | 382/309 |

(Continued)

FOREIGN PATENT DOCUMENTS

JP   04-346333 A   12/1992

(Continued)

*Primary Examiner*—Bhavesh M. Mehta
*Assistant Examiner*—Sath V. Perungavoor
(74) *Attorney, Agent, or Firm*—Sughrue Mion, PLLC

(57) ABSTRACT

The image processing method applies image processing to an inputted image data. The method registers predetermined image processing conditions for each specific person in advance, extracts a person in the inputted image data, identifies the extracted person to find if the extracted person is the specific person and selects image processing conditions corresponding to the identified specific person to perform the image processing based on the selected image processing conditions. Amusement aspect in photography and image representation can be enhanced, and even inexperienced or unskilled persons in personal computer or image processing software can correct images.

9 Claims, 8 Drawing Sheets

U.S. PATENT DOCUMENTS

| | | | |
|---|---|---|---|
| 6,788,824 B1* | 9/2004 | Prestia | 382/263 |
| 6,798,921 B1* | 9/2004 | Kinjo | 382/282 |
| 6,813,395 B1* | 11/2004 | Kinjo | 382/305 |
| 6,963,663 B1* | 11/2005 | Yoshida | 382/167 |
| 2002/0015514 A1* | 2/2002 | Kinjo | 382/118 |
| 2002/0046100 A1* | 4/2002 | Kinjo | 705/14 |
| 2002/0054325 A1* | 5/2002 | Nishio et al. | 358/1.15 |
| 2003/0067636 A1* | 4/2003 | Kanno et al. | 358/504 |
| 2005/0008246 A1* | 1/2005 | Kinjo | 382/254 |

FOREIGN PATENT DOCUMENTS

| | | |
|---|---|---|
| JP | 05-205030 A | 8/1993 |
| JP | 08-122944 A | 5/1996 |
| JP | 08-184925 A | 7/1996 |
| JP | 09-101579 A | 4/1997 |
| JP | 09-138470 A | 5/1997 |
| JP | 09-138471 A | 5/1997 |
| JP | 11-331570 A | 11/1999 |
| JP | 2000-151985 A | 5/2000 |

* cited by examiner

| REGISTERED CUSTOMER ID : * * * * * , REPRESENTATIVE: * * * * | | | |
|---|---|---|---|
| FAMILY MEMBERS | FACE IMAGE (MAY BE PLURAL) | REQUEST PROCESSING (MAY BE PLURAL) | |
| FATHER | 🙂 | SUNTANNED FACE | |
| MOTHER | 👩 👵 | SOFT FOCUS | WRINKLE ERASING |
| DAUGHTER A | 👧 | WHITE | SLIM BODY FINISH |

FIG.6

| MODE | COMPOSITION PATTERN (MAY BE PLURAL) | RELATIVE POSITION (NORMALIZE WITH A WIDTH OF A FACE) | SIZE(A WIDTH OF A FACE AS A STANDARD) | ORIENTATION (A FACE AS A STANDARD) |
|---|---|---|---|---|
| \multicolumn{5}{c}{REGISTERED CUSTOMER ID : * * * * * , REPRESENTATIVE: * * * *} |
| FRET | | BESIDE EYES $(x_1, y_1)$ | MAGNIFICATION 0.1 | LEFT SIDE |
| SURPRISE | | EYES $(x_2, y_2), (x_3, y_3)$ | 1.0 | ORIENTATION DETERMINATION RESULT |
| ANGER | | $(x_4, y_4)$ | ... | ... |
| SORROW | | ... | 0.5 | ... |
| WORRY | | ... | ... | ... |
| LOVE | | ... | ... | ... |
| PLEASURE | | ... | ... | ... |
| ⋮ | | ... | ... | ... |

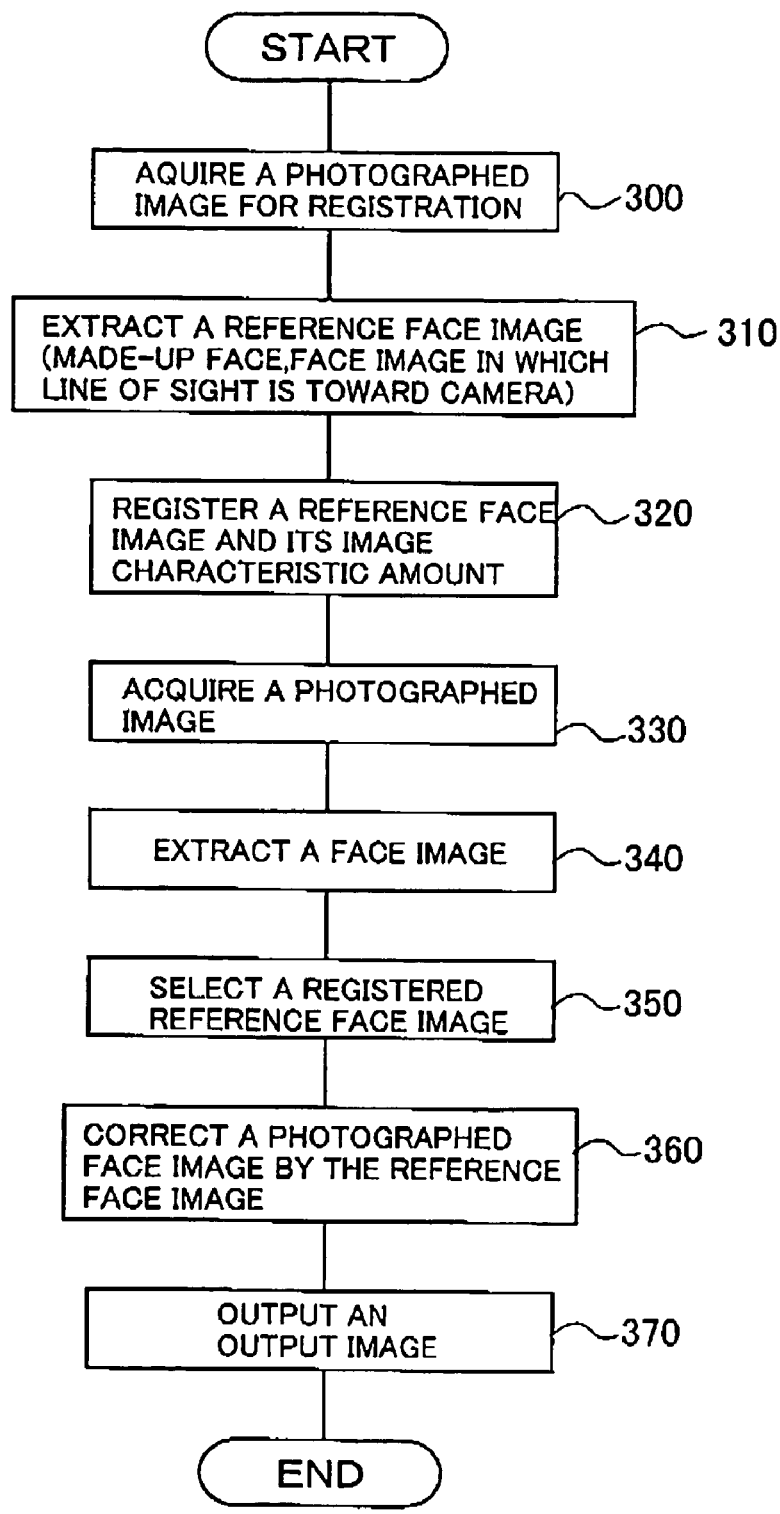

IMAGE PROCESSING METHOD USING CONDITIONS CORRESPONDING TO AN IDENTIFIED PERSON

BACKGROUND OF THE INVENTION

1. Field of the Invention

The present invention relates to an image processing method for converting input image data to output image data by applying image processing to the input image data. More specifically, the invention relates to an image processing method for preparing an output image meeting a request from an individual customer; an image processing method for additionally displaying information corresponding to a feeling of a person on an image displaying medium or the like on which an image of the person is displayed, or performing substitution, modification or adjustment to produce an image corresponding to the feeling; and an image processing method for changing an image of a person to a favorite image of the person or an image having no unnatural feeling.

2. Description of the Related Art

Conventionally, printing of an image photographed on a photographic film (hereinafter referred to as a film) such as a negative film or a reversal film to a photosensitive material (printing paper) has been performed by so-called direct exposure. With the direct exposure, the image on the film is projected on the photosensitive material and the surface of the photosensitive material is exposed to light.

On the other hand, in recent years, a printing apparatus that utilizes digital exposure, that is, a digital photoprinter, has been put to practical use. The digital photoprinter photoelectrically reads an image recorded on a film, converts the read image to a digital signal, then converts the digital signal to image data for recording by applying various kinds of image processing, and records an image (latent image) by scanning and exposing a photosensitive material by recording light that is modulated according to the image data to have a print (photograph).

The digital photoprinter can convert an image into digital image data and determine exposure conditions at the time of printing the image by image data processing. Thus, various kinds of image processing can be performed with a high degree of freedom, which is difficult or impossible with the conventional direct exposure, including correction of drop-outs or blocked-ups of an image due to back-light, strobe photographing or the like, correction of a color failure or a density failure, correction of under exposure or over exposure, correction of insufficient marginal luminosity, sharpness processing, and compression/expansion processing of density dynamic range (giving a dodging effect by image data processing). Therefore, an extremely high-grade print can be obtained compared with the direct exposure. Moreover, since composition and division of a plurality of images, composition of characters or the like can be performed by the image data processing, a print that is freely edited and/or processed depending on an application can be outputted.

In addition, since the digital photoprinter not only can output an image as a print but also can supply image data to a computer or the like or can store image data in a recording medium such as a floppy disk, the image data can be utilized for various applications other than a photograph.

In this way, with the digital photoprinter, it is possible to apply image processing with a higher degree of freedom to an image by the image data processing and to output a print with higher commodity value. Incidentally, it is preferable that an image to be reproduced as a print is an image on which a request of a customer (a person who requests preparation of a print) is reflected as much as possible. In this regard, the applicant has proposed an image processing method of reproducing a finished image that preferably corresponds to a request of a customer in Japanese Patent Application Laid-open No. Hei 11-331570.

That is, the method is to obtain a reproduced image preferably corresponding to a request of a customer by getting information on the customer relating to image data supplied from an image supplying source, setting image processing conditions according to the information on the customer, and performing image processing based on the image processing conditions.

In the laid-open patent application, information on a customer refers to an occupation of a customer, a sex of a customer, an age of a customer or the like. In addition, a method of obtaining information on a customer is exemplified by a method with which information on a customer is verbally obtained from the customer when an order of a print is received from the customer, which is communicated to an operator who inputs the information using an operating device such as a mouse, a method with which customer information is written in a customer card and an operator inputs the customer information referring to the customer card when preparing a print, or a method with which customer information is arranged as a database and an operator obtains the customer information from the database.

In addition, image processing that preferably corresponds to a request of a customer is exemplified by the following processing. In a case in which a film is a reversal film and an occupation is a professional photographer, an image photographed on the film is to be reproduced faithfully, and in a case in which an occupation is not a professional photographer, a photographing failure such as over exposure, under exposure and back-light is remedied by adjusting a color and a density of an image normally. In addition, in a case of a male, a face region is extracted and sharpness is given rather strongly to make gradation prominent and show details, and in a case of a females a face region is extracted and sharpness is given rather weakly or soft focusing is applied extremely weakly to make gradation less prominent (soft) and to make live spots, wrinkles, freckles or the like less outstanding.

However, the conventional image processing method has a problem in that processing is complicated because an operator must input information on a customer. In addition, there is also a problem in that image processing conditions to be set are fixed according to obtained information on a customer, or selection of conditions is limited only to whether the processing is performed or not, and there is no function of setting image processing conditions corresponding to preference of a customer or, more meticulously, of each subject person, thus, image reproduction to which preference of a customer or a subject person is truly reflected cannot be realized.

As image forming media, there are conventionally a photograph (print) that reproduces a still image and a movie (a film projector and a screen) that reproduces images as an animation. Since the development of a cathode-ray tube (CRT), in recent years, television sets (TVs) have been spread to all the households. Moreover, with remarkable advances of technologies, various image display devices such as a liquid crystal display, a plasma display and an electronic paper have been developed as image forming media.

Recently, image forming devices have been developed such as a video camera, a digital camera, a digital video movie camera, and a cellular TV telephone, which can capture voices together with images utilizing the above-mentioned image forming media.

However, although the above-mentioned conventional image forming devices can photograph images and, at the same time, record voices, the captured voice data is simply reproduced as sounds directly. In addition, there is also a problem in that the conventional image forming devices aim principally at reproducing an image as faithfully as possible as it is photographed, and an entertaining aspect of an image is not taken into account at all.

Further, in the present digital image processing technology, it is possible to adjust density or color tone of an image photographed and captured as digital image data, and image processing such as correction of the photographed image per se and composition or substitution with other images is also possible. Various digital image processing techniques have been thus proposed which include digital image processing technique conventionally performed in the field of photograph for correcting or adjusting a face of a person or a line of sight.

For example, Japanese Patent Application Laid-open No. 2000-151985 discloses a technique in which portions of an image of a face of a person and adjustment parameters are set to correct the image to have a made-up face. Ordinary people are not however familiar with adjustment of color tone or gradation, which is difficult processing for amateurs and in particular rather difficult for a user unfamiliar with a personal computer (hereinafter also referred to as "PC"). In some cases, good adjustment results cannot be obtained, and there is also a problem in that images very often have unnatural feeling after adjustment.

Further, Japanese Patent Application Laid-open No. 5-205030 discloses a technique in which an image of eyes in a full-faced state is prepared from a three-dimensional model of an image of a face of a person by computer graphics (hereinafter referred to as the "CG") technology. There is however a problem in that unnatural feeling remains on the image of eyes prepared by the CG technology. There is also a problem in that arithmetic computations enormously increase in quantity because of the preparation from the three-dimensional model depending on the CG technology.

On the other hand, among the digital image processing mentioned above, simple image processing can be performed with a personal computer, and to this end, various types of image processing software programs are commercially available. Nevertheless, the simple image processing by using these image processing software programs that are commercially available cannot provide a sufficient accuracy to finish an image of a face of a person so as to have a favorite face or to finish the image in a full-faced state by making a line of sight coincident with a photographing direction. There is also a problem in that the operation is difficult for amateurs.

SUMMARY OF THE INVENTION

The present invention has been devised in view of the above drawbacks, and it is a first object of the present invention to provide an image processing method with which a reproduced image, on which preference of each subject person is reflected, can be automatically obtained.

The present invention has been devised in view of the above drawbacks, and it is a second object of the present invention to provide an image processing method with which amusement aspect in image forming media such as a photograph, a video, a TV telephone and the like can be enhanced by visualizing a content that is desired to be emphasized according to a type of feeling of a person in a photographed image, particularly an image of the person, and forming an image.

The present invention has been devised in view of the above drawbacks, and it is a third object of the present invention to provide an image processing method with which even inexperienced or unskilled persons in personal computer or image processing software can easily correct images so as to have a preferred made-up face or a favorite face and remove unnatural feeling due to noncoincidence of the line of sight.

In order to attain the first object described above, the first aspect of the present invention provides an image processing method for applying image processing to an inputted image data, comprising the steps of registering predetermined image processing conditions for each specific person in advance; extracting a person in the inputted image data; identifying the extracted person to find if the extracted person is the specific person; and selecting image processing conditions corresponding to the identified specific person to perform the image processing based on the selected image processing conditions.

Preferably, the extracted person is identified using a face image of the specific person registered in advance or person designation information accompanying a photographed frame.

Preferably, a plurality of kinds of image processing conditions are set for the each specific person as the predetermined image processing conditions to be registered for the each specific person in advance.

Preferably, the image processing is performed by using at least one image processing condition selected from the plurality of kinds of image processing conditions.

Preferably, it is set whether the image processing under the selected image processing conditions is applied to an image as a whole or applied only to the person or the person and a vicinity of the person.

In order to attain the second object described above, the second aspect of the present invention provides an image processing method, comprising the steps of determining a type of feeling from types of feeling registered in advance based on at least one kind of information selected from among voice data accompanying a photographed image, an expression of a person extracted from the photographed image, and a gesture of the extracted person; and subjecting the photographed image to image processing which applies an image processing pattern corresponding to the determined type of feeling among image processing patterns set in advance.

Preferably, the image processing pattern is set fin association with the type of feeling, and the image processing to which the image processing pattern is applied is at least one processing selected from among composition processing for composing a specified mark corresponding to the type of feeling, substitution processing for substituting with an animation image or a computer graphics image corresponding to the type of feeling, image modification processing performed on the photographed image in correspondence with the type of feeling, and processing for changing a density and a color of the photographed image in correspondence with the type of feeling.

Preferably, the composition processing is processing for composing the specified mark at a predetermined position in the photographed image or at a predetermined or relative position with respect to the person extracted in advance or during the composition processing from the photographed image, and in a predetermined or relative size and a predetermined or relative orientation with respect to the photographed image or the extracted person.

Preferably, the substitution processing is processing for substituting a specified portion of the person extracted in advance or during the substitution processing from the photographed image with the animation image or the computer graphics image.

Preferably, the photographed image is a photographed image by an image photographing device with a recording function, and the image processing pattern is registered in the image photographing device with the recording function in advance, and the image processing to which the image processing pattern is applied is performed by the image photographing device with the recording function.

Preferably, the image processing to which the image processing pattern is applied is performed on a lab side that receives image photographing information including the voice data recorded by the image photographing device with the recording function.

Preferably, the photographed image is a photographed image by a telephone call device with a photographing function, and the image processing to which the image processing pattern corresponding to the type of feeling of the person is applied is performed on the photographed image.

Preferably, the image processing pattern is registered in the telephone call device with the photographing function in advance, and the image processing is performed by the telephone call device with the photographing function to transmit a processed image to a terminal on an opposite party side.

Preferably, the image processing pattern is registered in a repeater station of the telephone call device with the photographing function in advance, and the image processing is performed in the repeater station to transmit a processed image to one terminal in a connected telephone line.

Preferably, the image processing pattern is registered in the telephone call device with the photographing function in advance, and the image processing to which the image processing pattern is applied is performed by the telephone call device with the photographing function on an image that was photographed by a terminal on an opposite party side and received by the telephone call device with the photographing function.

Preferably, if a specified mark corresponding to the type of feeling or a composing position of the mark is wrong in the image processing to which the image processing pattern is applied, the mark corresponding to the type of feeling, the composing position of the mark and a size or an orientation of the mark can be corrected.

In order to attain the second object described above, the third aspect of the present invention provides an image processing method comprising the steps of capturing a television image in a personal computer; and performing image processing to which an image processing pattern is set in advance on the captured television image in the personal computer.

In order to attain the third object described above, the fourth aspect of the present invention provides an image processing method comprising the steps of registering in advance an area image in a specific area of an image or an image characteristic amount; and composing on a corresponding area of an photographed image or adjusting a density and a color tone by using the area image or image characteristic amount registered in advance.

Preferably, the corresponding area is extracted from the photographed image in accordance with the area image or the image characteristic amount registered in advance.

Preferably, the specific area is at least one of a face of a person, at least one portion constituting the face of the person, an accessory that the person wears and a background.

Preferably, the specific area is a face of a person, and the area image registered in advance is an image of a made-up face or best face of the person.

Preferably, the specific area is an area of eyes constituting a face of a person, and determination is made as to whether the person as a subject in the photographed image is in a stationary state, and when the person is in the stationary state, the area image in the specific area registered in advance is composed on the area of eyes constituting the face of the person.

Preferably, the area image registered in advance is an image of the area of eyes in which a line of sight of the person is coincident with a photographing direction.

BRIEF DESCRIPTION OF THE DRAWINGS

In the accompanying drawings:

FIG. 6 is an explanatory illustration showing an example of an image processing pattern;

FIG. 9 is a flow chart showing a flow of processing of image processing methods in accordance with first and second embodiments of the fourth aspect of the present invention.

DETAILED DESCRIPTION OF THE PREFERRED EMBODIMENTS

Figure 1:
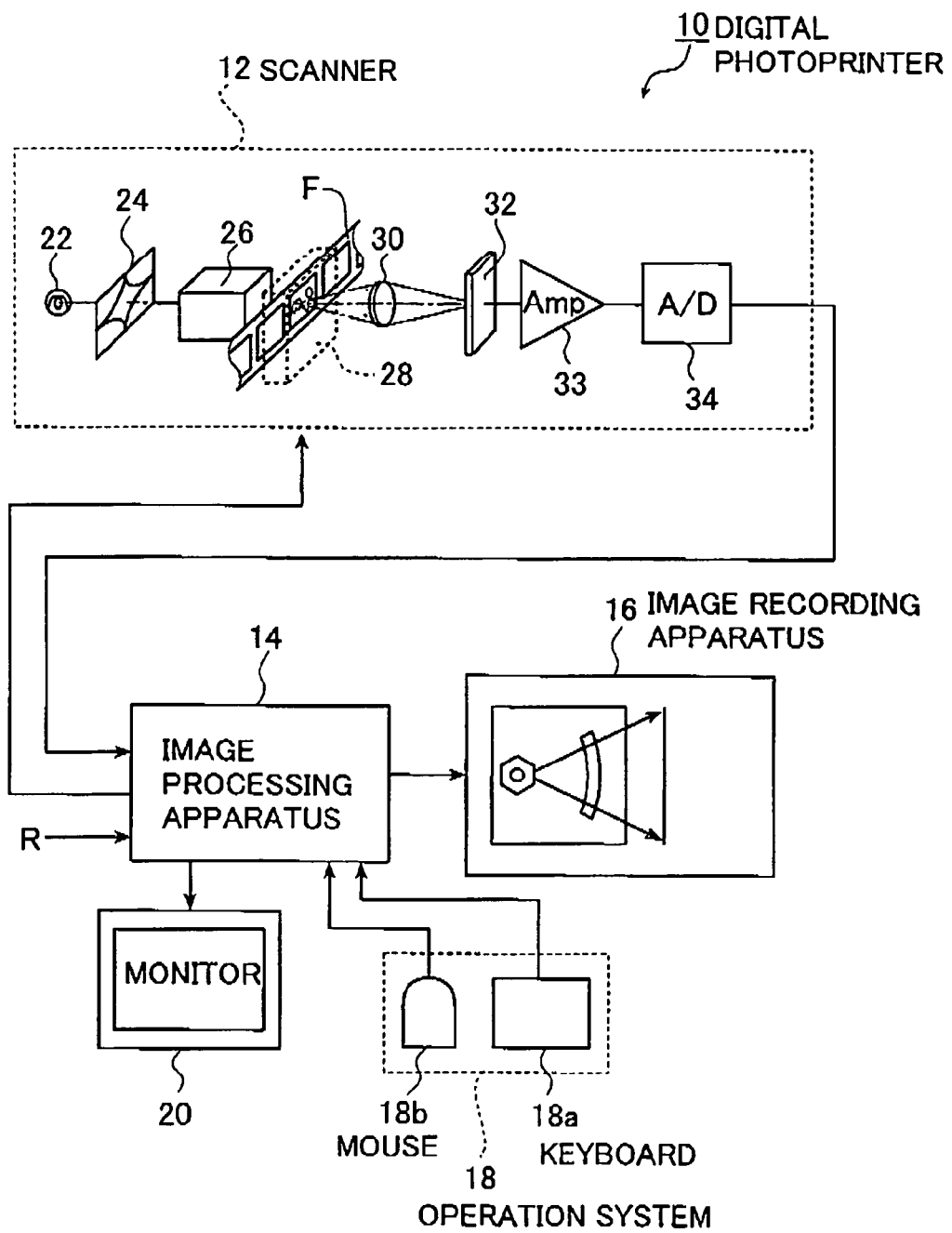
FIG. 1 is a block diagram schematically showing an example of a digital photoprinter including an image processing apparatus that implements an image processing method in accordance with a first aspect of the present invention.

An image processing method in accordance with the present invention will be hereinafter described in detail based on preferred embodiments of the present invention shown in the accompanying drawings.

In the following description of the embodiments, reference is made to drawing figures. Like reference numerals used throughout the several figures refer to like or corresponding parts.

An image processing method in accordance with a first aspect of the present invention will be described first with reference to FIGS. 1 to 3.

FIG. 1 is a block diagram schematically showing an example of a digital photoprinter including an image processing apparatus that implements an image processing method of automatically obtaining a reproduced image, on which preference of an individual customer is reflected, in accordance with a first aspect of the present invention.

A digital photoprinter (hereinafter referred to as a photoprinter) 10 shown in FIG. 1 includes a scanner (image reading apparatus) 12 for photoelectrically reading an image photographed on a film F, an image processing apparatus 14 for performing image processing such as electronic magnification processing of image data read by the scanner 12, edge detection and sharpness emphasis of image data and smoothing processing (granularity restraining), or operation, control and the like of the entire photoprinter 10, and an image recording apparatus 16 for applying image exposure and developing processing to a photosensitive material (printing paper) by light-beam that is modulated according to the image data outputted from the image processing apparatus 14 to output a (finished) image as a print.

In addition, an operation system 18 including a keyboard 18a and a mouse 18b for inputting a selection or an instruction of input, setting and processing of various conditions, an instruction of color/density correction, or the like, and a monitor 20 for displaying the image read by the scanner 12, various operational instructions, a setting/registration screen of various conditions, and the like are connected to the image processing apparatus 14.

The scanner 12 is an apparatus for photoelectrically reading an image photographed on a film F or the like one frame after another, which includes a light source 22, a variable diaphragm 24, a diffusion box 26 for equalizing reading light incident on the film F in the surface direction of the film F, a carrier 28 of the film F, an imaging lens unit 30, an image sensor 32 having a three-line CCD sensor dealing with reading of each color image density of R (red), G (green) and B (blue), an amplifier 33 and an A/D (analog/digital) converter 34.

In the photoprinter 10, the carrier 28 that is for special-use with and detachably attachable to the body of the scanner 12 is prepared according to a type and a size of the film F such as a film of the Advanced Photo System, a negative (or reversal) film of the 135 size or the like, a form of a film such as a strips and a slide, or the like. Thus, the photoprinter 10 can cope with various kinds of films and processing by replacing the carrier 28. An image (frame) that is photographed on a film and is served for preparing a print is conveyed to a predetermined reading position by the carrier 28.

In addition, as is well-known, a magnetic recording medium is formed in a film of the Advanced Photo System, on which an cartridge ID and a film size, an ISO sensitivity, and the like are recorded. Further, various data such as a date and time of photographing or development, an exposure level, a type of a camera or a developing machine can be recorded at the time of photographing, development or the like. A reader of this magnetic information is disposed on the carrier 28 dealing with a film (cartridge) of the Advanced Photo System, which reads the magnetic information when the film is conveyed to a reading position. The read various information is sent to the image processing apparatus 14.

In the scanner 12 as described above, when an image photographed on the film F is read, uniform reading light, which is irradiated from the light source 22 and whose amount is adjusted by the variable diaphragm 24 and the diffusion box 26, is incident on and transmits through the film F located in the predetermined reading position by the carrier 28. A projected light bearing the image photographed on the film F is thereby obtained.

Further, a color image signal is not limited to a signal inputted by reading light that has transmitted through a film, but a reflected original or an image photographed by a digital camera may be used. That is, an image (digital image signal) can be inputted in the image processing apparatus 14 from, other than the scanner 12 for reading an image of a film, an image supplying source R, such as image photographing devices such as a digital camera and a digital video camera, an image reading apparatus for reading an image of a reflected original, communication networks such as an LAN (Local Area Network) and a computer communication network, and a medium (recording medium) such as a memory card, such as a smart medium, and an MO (mangetooptical recording medium).

The illustrated carrier 28 deals with an elongated film F (strips) such as a 24-exposure film of the 135 size and a cartridge of the Advance Photo System.

The film F is placed in a reading position by the carrier 28, on which reading light is irradiated while it is conveyed in a sub-scanning direction perpendicular to a main scanning direction that is an extending direction of the three-line CCD sensor of R, G and B. Thus, as a result, the film F is slit-scanned two-dimensionally and an image of each frame photographed on the film F is read.

Projected light of the film F is imaged on a light-receiving surface of the image sensor 32 by the imaging lens unit 30.

Each output signal of R, G and B outputted from the image sensor 32 is amplified by the amplifier 33 and sent to the A/D converter 34. In the A/D converter 34, each output signal is converted to R, G and B digital image data of, for example, 12 bits, and then outputted to the image processing apparatus 14.

Further, in the scanner 12, image reading is performed twice, i.e., pre-scan for reading an image with low resolution (first image reading) and fine scan for obtaining image data of an output image (second image reading), when an image photographed on the film F is read.

Here, the pre-scan is performed under pre-scan reading conditions set in advance such that the scanner 12 can read all the images on the film F, which are objects of the scanner 12, while the image sensor 32 does not saturate.

On the other hand, the fine scan is performed under reading conditions of the fine scan set for each frame such that the image sensor 32 saturates at a density slightly lower than a lowest density of the image (frame). Further, output image signals of the pre-scan or the fine scan are basically similar image data except that resolutions and output image signal levels are different.

Further, the scanner 12 used in the photoprinter 10 is not limited to a scanner that performs such slit-scan reading, but may be a scanner that performs plane reading for reading the entire surface of a film image of one frame at a time.

In this case, the scanner 12 uses an area sensor such as an area CCD sensor, and an inserting device for each of the color filters of R, G and B is provided between the light source 22 and the film F. The color filter is inserted in an optical path of light irradiated from the light source 22.

Reading light that has transmitted through the color filters is irradiated on the entire surface of the film F to cause the transmitting light to focus on the area CCD sensor for reading the entire image of the film. The scanner 12 dissolves an image photographed on the film F into three primary colors to read them by replacing each color filter of R, G and B one after another to repeat this processing.

As described before, the digital image data signal outputted from the scanner 12 is outputted to the image processing apparatus 14 that implements the image processing method in accordance with this aspect of the present invention.

In order to first correct dispersion of sensitivities for each pixel of the R, G and B digital image data and dark current due to the CCD sensor with respect to the image signals of R, G and B inputted in the image processing apparatus 14 from the scanner 12, data correction of read image data such as DC offset correction, dark state correction, defective image correction and shading correction is performed. Thereafter, the image data is subject to logarithmical conversion processing and gradation conversion, and is converted into digital image density data.

The pre-scan image data and the fine scan image data in the digital image density data are separately memorized (stored). The pre-scan image data is subject to a predetermined image processing and displayed on the monitor 20. In addition, a density histogram is prepared and image characteristic volumes such as an average density, an LATD (large area transmission density), a highlight (minimum density) and a shadow (maximum density) are calculated from the pre-scan image data to set reading conditions and image processing conditions of the fine scan. In this aspect of the present invention, image processing conditions are set such that individual preference of each customer is reflected on the conditions as described later. Image processing is applied to the fine scan image data according to the set image processing conditions, and is outputted on color paper from the image recording apparatus 16 as an optimal, high quality image at a density, gradation and tone that are desired as a color print.

The digital photoprinter including the image processing apparatus that implements the image processing method in accordance with the first aspect of the present invention is basically configured as described above.

Operations of a first embodiment of the first aspect of the present invention will be hereinafter described.

As described above, the image processing according to individual preference of each customer is executed in the image processing apparatus 14 together with the processing such as conversion of a density, a color and gradation of image data, conversion of a chroma and electronic magnification with respect to the fine scan image data that is read with the image reading conditions that are set based on the pre-scan image data.

The image processing on which individual preference of each customer is reflected will be hereinafter described.

First, as a precondition, data such as individual identification information and image processing conditions desired by each individual (request processing information) is registered in a lab in advance in order to identify a person in an image and execute image processing according to preference of the specific person.

Figures 2, 3:
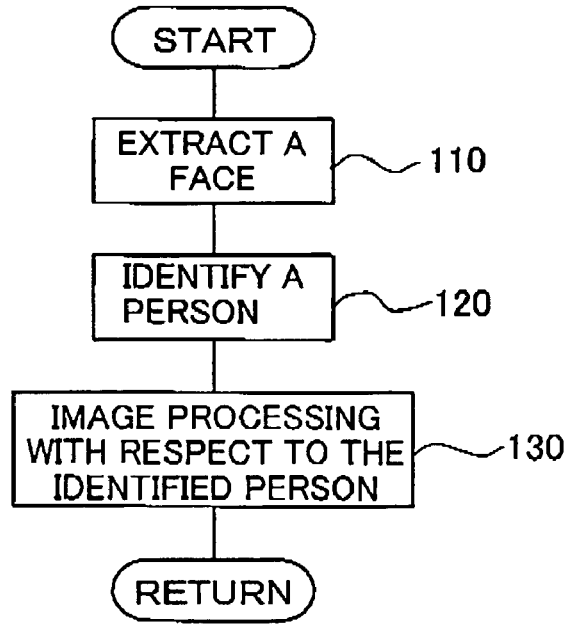
FIG. 2 is an explanatory illustration showing an example of registration data used in the present invention.
FIG. 3 is a flow chart showing operations of a first embodiment of the first aspect of the present invention.

An example of registration data is shown in FIG. 2. The example shown in FIG. 2 is in a case in which data of all members of a family is registered.

Contents of the registered data are, for example, registered customer IDs, a name of a person representing the people to be registered and individual data of each member of the family, i.e., a relation in the family, a face image of each individual, image processing contents desired by each individual (request processing), and the like.

Face image data may be captured by designating, for example, a face area in an already ordered photographed scene. In addition, a plurality of patterns for each person may be set and registered in order to increase accuracy of identification.

In addition, as examples of request processing, there are adjustment of a density/color tint of a face, conversion of a color of hair, eyes, rouge or the like to a designated color, white finish of teeth, a special effect, slim body finish, image composition and the like.

Here, as adjustment of a density/color tint of a face, a mode for changing skin to white, a mode for erasing wrinkles, a suntan mode and the like can be considered. As a special effect, there are use of a cloth filter, soft focus finish and the like. As image composition, there are frame decoration, composition of specific characters, special make-up and the like.

A plurality of kinds of the above-mentioned request processing may be set for each person, and some selected kinds of request processing out of the plurality of kinds of the request processing may be combined to be applied to image processing of a specific person.

Moreover, depending on processing contents, conditions such as whether the processing is applied to the entire image, or applied only to a pertinent person or only to the person and the vicinity of the person are set.

Image processing on which individual preference of each customer is reflected will be hereinafter described with reference to a flow chart of FIG. 3.

In step 110, a face region of a person is extracted. An extracting method of a face region is not specifically limited but there are a variety of methods. It is sufficient if a publicly known specific part extracting method (extraction algorithm) is used.

Such a specific part extracting method is exemplified by a method with which a plurality of different specific part (major part) extracting methods, such as a method of extracting a specific color, a method of extracting a specific shape pattern, and a method of removing a region that is estimated to be equivalent to a background disclosed in Japanese Patent Application Laid-open No. Hei 9-138470, are evaluated to define weights in advance, a specific part is extracted by each extracting device, the extracted specific part is weighted by the defined weight, and the major part is determined and extracted according to a result of the weighting.

In addition, another specific part extracting method is exemplified by a method with which densities or luminance of a plurality of points in an image are measured to find variations among the points, a point with a variation equal to or more than a predetermined value is set as a standard point, then a retrieval area and a retrieval direction pattern are set using a variation or the like of a density or the like within a predetermined range from the standard point to retrieve a part with a variation of a density or the like in the direction indicated by the retrieval direction pattern within the retrieval area, and subsequently the retrieval is repeated with this part as a standard point to extract a specific part by connecting retrieved/set standard points as disclosed in Japanese Patent Application Laid-open No. Hei 9-138471.

In this aspect of the present invention, specific part extracting methods disclosed in each of Japanese Patent Application Laid-open No. Hei 4-346333, 5-158164, 5-165120, 6-160993, 8-122944, 8-184925, 9-101579, 9-146194, 9-197575 and the like are preferably available other than the above-mentioned methods.

When a face is extracted, a person is identified and a person in the image is specified in step 120.

After normalizing sizes, matching is performed with respect to the extracted face image with registered face images as a template to find a coinciding degree, and a person is identified. At this point, if information indicating the person in the image exists as information relating to a comment accompanying the image, the information may be utilized for identification of a person.

If a person is successfully specified as a result of the identification of a person, request processing for the registered person is executed with respect to the specific person in step 130.

In this way, according to this embodiment, a finished image according to individual preference of each customer can be automatically obtained. For example, an image of the father is processed to be a suntanned face, soft focus and wrinkle erasing processing are applied to an image of the mother, and white skin and slim body finish is applied to an image of a daughter A. Thus, finished images as the members of the family wish to have are obtained, respectively.

A second embodiment of the first aspect of the present invention will now be described.

The second embodiment is to execute processing as described in the first embodiment in a case in which a customer performs reproduction processing of an image using a digital camera, a personal computer, a photo player or the like. That is, before the customer places an order with a lab, a photographed image is displayed on these devices to revise the image. Causing a digital camera or a photo player to have a revising function, or connecting the devices with a personal computer can revise an image.

In addition, if a displayed image is revised, although the revision can be automatically performed using image processing software for performing processing similar to that of the first embodiment, a customer may manually identify a person and revise a result of detecting a person while looking at the displayed image. In addition, an image of a result of the revision may be printed using a video printer for home use, or revision data of a frame may be recorded as information attached to the frame to order a print for the lab. For example, it is sufficient to display an image photographed by the APS on a photo player to revise the image, and if an order is placed with the lab to print from a negative film, to cause the photo player to have a magnetic recording function and to magnetically record the attached information in the negative film. In addition, if an order is placed with the lab using a communication line by a personal computer, it is sufficient to record the attached information in a file.

A third embodiment of the first aspect of the present invention will now be described.

As described in the first embodiment, this embodiment is to improve accuracy of identification of a person by adding a hair style, a dress and the like as person designation information to characteristic amounts for recognition of a person, when a face is extracted and template matching is performed between the face and the registered face image in identification of a person. Here, as the characteristic amounts for recognition of a person, a density, a distribution of color tint, a texture pattern or the like can be considered.

In this embodiment, as in the first embodiment, at first a face region is extracted from an input image to perform matching with registered face images as a template, to find a coinciding degree and to identify a person. Then, if a person in an image is specified by the identification of a person, a hairstyle, a dress and the like of the person are extracted, which are registered as person designation information and as registration data corresponding to the person.

In the next processing on the input image, identification of a person is performed with reference to the hairstyle, the dress and the like that have been registered before in addition to by means of matching of the template of the extracted face image. When a person is specified by the identification of a person, a hairstyle and a dress are registered anew from the input image to automatically accumulate them as person designation information.

For example, it is assumed that data accumulated to the present concerning color tint of dress areas is as shown in Table 1. This Table 1 classifies color tint of dress areas and indicates frequencies of colors appearing in each member of a family by pij.

TABLE 1

| | Classifications of color tint | | | | |
|---|---|---|---|---|---|
| i: Person | Red | Orange | Yellow | ... ... | Achromatic color |
| 1. Father | 0 | ... | ... | $p_{1j}$ ... | $p_{1J}$ |
| 2. Mother | 3 | ... | ... | $p_{2j}$ ... | $p_{2J}$ |
| 3. Daughter A | 10 | ... | ... | $p_{3j}$ ... | $p_{3J}$ |

J indicates the number of classifications of color tine. If a dress is composed of a plurality of colors, an area ratio is used for classifications. For example, if a half of a dress is red and the other half is white, red=0.5 and white=0.5 are registered in accumulated data.

Here, it is assumed that Mi is a coinciding degree by the pattern matching of a face image represented by a point, and Ni is a point derived from a frequency of appearance of a dress. The large each coinciding degree, the large a point is. In Table 1, i is a number indicating a registered person. For example, the daughter A is i=3. It is assumed that, if color tint of a dress area of a subject person being an object of photographing corresponds to a classification number j, $N_i = p_{ij}/(p_{1j}+p_{2j}+p_{3j})$.

By finding a person determination point $D_i = a \times M_i + b \times N_i$ (a and b are weighting factors), it is determined that a person with the number i being the largest point is the person in the image.

For example, it is assumed that $M1 < M2 \approx M3$ as a result of the matching of a face image, thus the mother and the daughter A have substantially the same points. Here, if the color tint of a dress is red, since the number of times each person is photographed while dressed in red is 0 for the father, 3 for the mother and 10 for the daughter A, the daughter A has the largest point Di. Therefore, the person in the image is determined to be the daughter A.

If there is an error in the identification of a person, an operator who has found the error or an operator who has been notified by a customer makes a revision manually, performs processing with respect to a correct person in the image and, at the same time, corrects accumulation processing of the person designation information.

In addition, parameters for a determination algorithm for identification of a person are automatically revised at this point.

In addition, a customer who has found an error in identification of a person may revise the processing by himself if the customer revises an image in person by downloading image processing software in the customer's own personal computer as in the second embodiment.

According to this embodiment, in addition to simply performing the template matching of an image with a registered face image, person designation information such as a hairstyle and a dress is also added to characteristic amounts for recognition of an individual, and moreover, accumulated data is revised by adding an element of learning function to the accumulation processing of the person designation information. Therefore, accuracy of the identification of a person can be improved, and image processing according to preference of each person can be properly performed.

The above description relates to a method of obtaining a print (output image) on which individual preference of each customer is reflected by applying image processing according to the individual preference of each customer to each person in an image. However, in some cases, it is desired that a print is outputted on which the tendency of preference according to locality of a customer or a season is reflected in addition to matching individual preference of each customer.

For example, in a case in which an exposure control algorithm is set such that a photo print is finished in a skin color preferred by the Japanese in a photoprinter, if a printer of the same type is used in Europe without changing the exposure control algorithm, a skin color may not be a color preferred by the Europeans. In addition, in a case in which the exposure control algorithm is set based on photographing under the sunlight in Japan, if a photo printer of the same type is used in a region at a substantially different latitude, a print of the same quality as that in Japan cannot be realized because the sunlight is also different in this region from that in Japan.

Thus, the applicant has already proposed an exposure control method with which local preference of a person or preference of an individual customer is properly reflected on a print in the case of the analog exposure method in Japanese Patent Application Laid-open No. Hei 6-308632 or Japanese Patent Application Laid-open No. Hei 8-137033.

A print (output image) on which locality or the tendency of preference of a customer is reflected can also be realized in the case of the digital image processing as described below.

That is, an example described below is a digital image processing method of accumulating the tendency of revising a setting of image processing conditions for each customer, lab or region to revise and optimize a setting parameter of image processing by. In addition, the method is also for classifying each frame by scene to accumulate the tendency of revision for each scene classification, and revise and optimize the setting parameter.

For example, when performing image processing, if a correction tendency of an operator shows, after classifying each frame by scene, varying tendencies for a certain region such as that it is preferred to emphasize a contrast or to be moderate in a contrast, the operator revises a correction parameter in accordance with the tendencies.

Describing the processing method more specifically, revisions of a processing parameter by an operator are accumulated for the number of N frames in the past to check relation with a specific scene classification. At this point, there are the following methods as methods of classifying scenes.

For example, a scene is estimated as a strobe scene, a back-light scene or the like by estimating a normal scene, over exposure, under exposure or the like based on a distribution pattern found from a density histogram or the relation between density differences between a central part and a peripheral part of an image.

Alternatively, a scene is estimated to be a person, a scenery or the like by extracting a face. There are some other methods such as a method with which an operator manually estimates a classification of a scene such as a person, a scenery, a night scene, underexposure or high contrast.

In addition, as an example of changing a processing parameter, there is such a method with which a way of applying contrast emphasis or resolution (sharpness) is changed or a target value of color tint or a density of a skin color of a person is changed. Since a person and a preferable skin color varies depending on a region, this method takes into account the difference due to a region. Since, in Europe, a color of a face that is less dense than a skin color based on the Oriental people is preferred and an operator tends to reduce a density, an algorithm is automatically updated such that a density becomes slightly lower than a default value after a face is extracted judging from accumulated data.

As described above, changes of a processing parameter by an operator are classified for the number of N frames in the past, relation between the classification and a specific scene classification is found. Then, an algorithm is updated and an image processing parameter is optimized in a fixed cycle by reflecting a statistic manual correction tendency for each image processing parameter in a predetermined scene classification.

Further, in this case, it is preferable to also update accumulated data to latest one in a fixed cycle.

In addition, in the above-mentioned processing, types of scene classifications or a data accumulation period may be set for each season. For example, around a ski resort, a "snow scene" classification that is determined according to a highlight ratio in a scene may be added only in the winter season, or a gradation characteristic emphasizing whiteness may be applied to the "snow scene".

In addition, in a fixed region, algorithm updating processing of the region may be performed by a unit of region in a lab management center. This can be attained by connecting each mini-lab shop in the region and the lab management center in the region by a network such that the lab management center collects information on revisions by an operator in each mini-lab shop, grasps a tendency of the entire region, revises image processing software of mini-lab shops all over the region at a certain timing, and distributes an updated algorithm to each mini-lab shop.

In addition, when performing the above-mentioned processing, an image processing parameter may be optimized for each customer by recording the data together with customer IDs and managing the data for each customer.

Further, the above-mentioned processing can be performed with respect to a printer for home use of each customer instead of a printer in the above-mentioned mini-lab.

According to the example mentioned above, an appropriate image reproduction becomes possible which copes with the change of a tendency of preference for each scene due to an individual customer, locality, a season or the like.

In addition, when a photoprinter is manufactured, it becomes unnecessary to set every parameter to conform to a tendency of each region being a destination of the product and operations for manufacturing and delivering the product is facilitated.

In addition, request contents may be divided for each of print processing and monitor display processing, or registration data processing can be stopped or specific request processing can be designated only for a specific frame.

The image processing method of the first aspect of the present invention is basically configured as described above.

Image processing methods in accordance with second and third aspects of the present invention will now be described with reference to FIGS. 4 to 7.

The image processing method in accordance with the second aspect of the present invention is basically to determine a type of feeling of a person in a photographed image scene based on voice data accompanying the image scene or based on an expression or gesture of the person extracted from the photographed image, and attach (compose) a mark emphasizing the feeling corresponding to the type of feeling to an image of the person in the scene, thereby enhancing amusement aspect of a photograph or an image expression. A case in which a type of feeling of a person in a photographed image scene is determined based on voice data accompanying the photographed image scene will be described below as a typical example, but the second aspect is not limited to this case. Further, objects to which the second aspect of the present invention is applied range widely from a photograph (still image) to real time image display-such as a video (animation) and a TV telephone, or the like.

A first embodiment of the second aspect of the present invention will be described first. The first embodiment is for applying predetermined image processing with respect to an image having voice data as accompanying information which is photographed by a digital camera or the like having a voice recording function.

Figure 4:
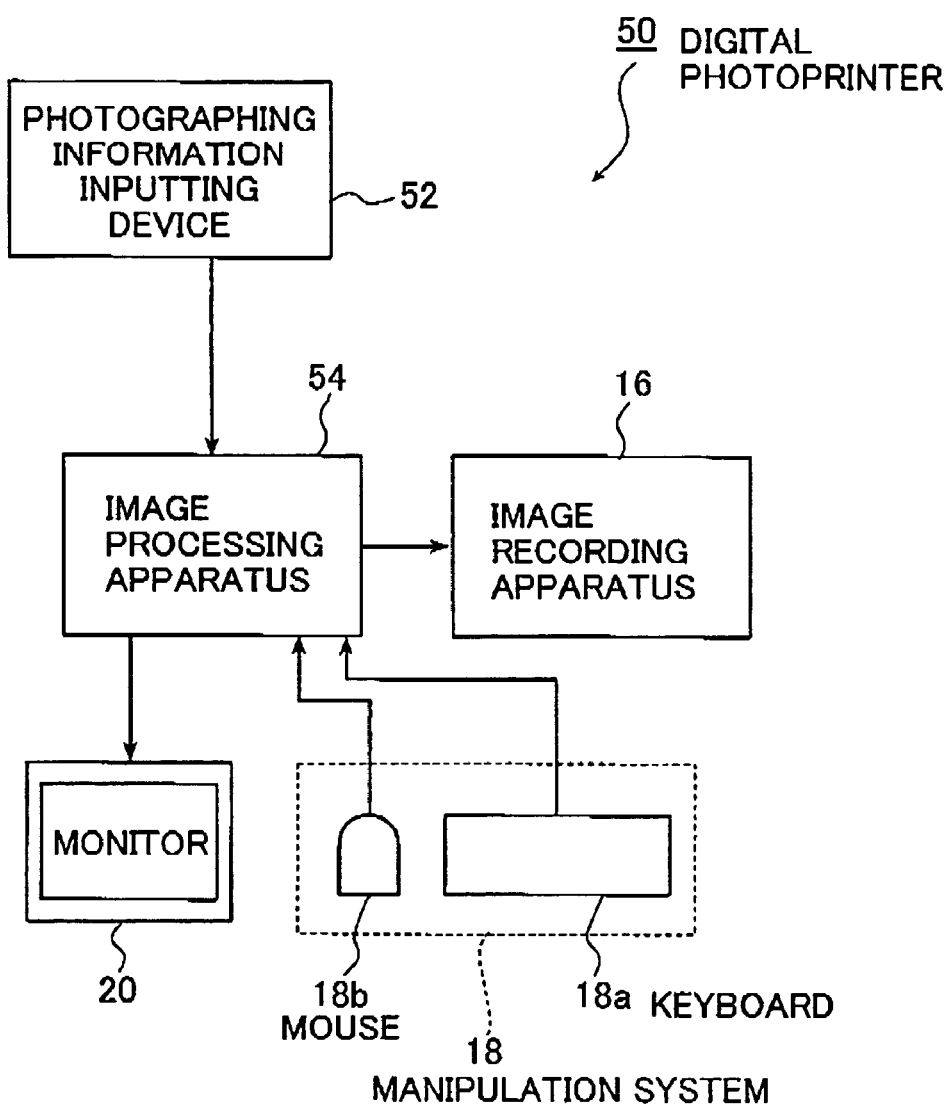
FIG. 4 is a block diagram schematically showing an example of a digital photoprinter including an image processing apparatus implementing an image processing method in accordance with a second aspect of the present invention.

FIG. 4 is a block diagram schematically showing a digital photoprinter including an image processing apparatus that implements the image processing method in accordance with the first embodiment of the second aspect of the present invention.

A digital photoprinter 50 shown in FIG. 4 mainly includes a photographing information inputting device 52, an image processing apparatus 54 and an image recording apparatus 16. Further, the image recording apparatus 16, the operation system 18 and the monitor 20 similar to those in the photoprinter 10 shown in FIG. 1 can be used.

The photographing information inputting device 52 is to read image data and voice data from a recording medium in which the image data and the voice data are recorded by an image photographing device with a recording function such as a digital camera. The image processing apparatus 54 is to execute the image processing method in accordance with this aspect of the present invention and other various kinds of image processing. In addition, the operation system 18 including the keyboard 18a and the mouse 18b for inputting and setting conditions for various kinds of image processing, selecting and instructing a particular processing, and instructing color/density correction, or the like, and the monitor 20 for displaying the image inputted from the photographing information inputting device 52, a setting/registration screen for various conditions including various operational instructions, and the like are connected to the image processing apparatus 54. The image recording apparatus 16 is to apply image exposure and developing processing to a photosensitive material (printing paper) by light-beam that is modulated in accordance with the image data outputted from the image processing apparatus 54 to output a (finished) image as a print.

Figure 5:
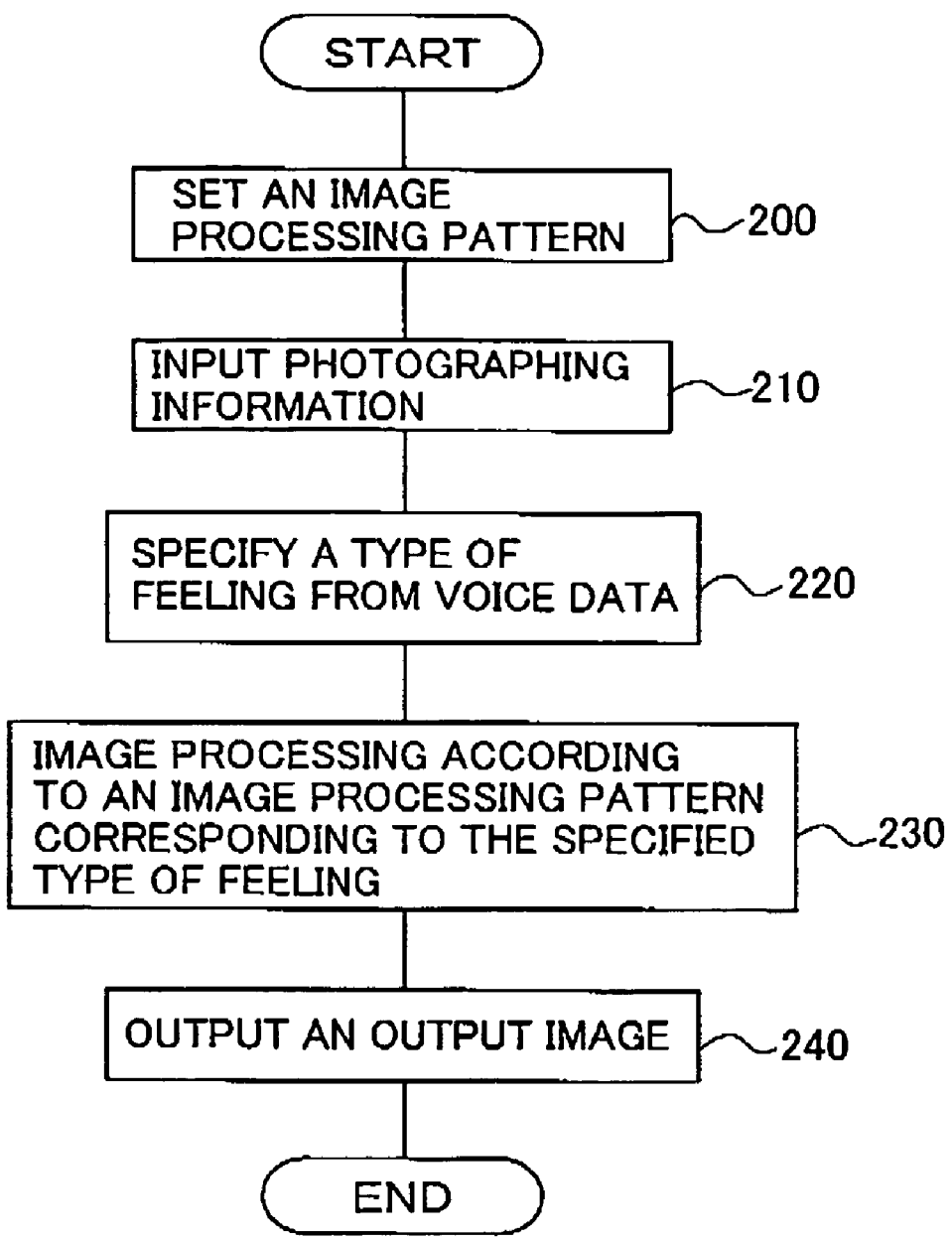
FIG. 5 is a flow chart showing a flow of processing of an image processing method in accordance with a first embodiment of the second aspect of the present invention.

Image processing of the first embodiment will be hereinafter described with reference to a flow chart of FIG. 5.

First, in step 200, image processing patterns corresponding to various types of feelings are set in advance. However, since feelings of a human varies and it is impossible to deal with all the feelings, only typical feelings that relatively clearly appear outside are dealt with here.

FIG. 6 shows an example of setting image processing patterns. As shown in the column indicated as a mode, the types of feelings to be dealt with here include "fret", "surprise", "anger", "sorrow", "worry (doubt)", "love", "pleasure" and the like.

In this embodiment, a type of feeling is determined by voice data (voice information) accompanying a photographed image scene. In addition, as an image processing pattern, a mark (image composition pattern) is composed which emphasizes a feeling with respect to each type of feeling. Therefore, setting an image processing pattern corresponding to a type of feeling is eventually setting an image composition pattern corresponding to specific voice information.

That is, items that are set in advance include a mode for representing a type of feeling, a word for drawing each mode (keyword, omitted in the table in FIG. 6), and an image composition pattern corresponding to each mode. The image composition pattern includes a composition image (mark) to be composed, a position where an image should be composed (a position in an image, a specified or relative position with respect to a position of a person or his or her face in an image), a size of a composition image (a size, a size with respect to an image, a relative size with respect to a size of a person or his or her face in an image), an orientation of a composition image with respect to a person or his or her face and the like.

For example, if a keyword such as "ow", "chickie" or "zex" is in voice information, the "fret" mode corresponds to the feeling, and a "sweat mark" is composed with respect to an image of a person. A composition image is not limited to one, but may be plural. In addition, a composing position is preferably designated by a position relative to a position of a face in an image and is more preferably normalized with a width of the face. A size of a composition image is also preferably designated based on a face. In addition, an orientation of composing a composition image is also preferably set based on a face of a person in an image.

For example, in a case of FIG. 6, two sweat marks (one set consists of two marks) are composed in the left of a face with a coordinate of a center of the sweat marks in the position beside an eye (x1, y1) (with an eye as the origin) and in the size of 0.1 when the width of the face is 1.

In addition, in a case in which a keyword such as "whoof", "jiminy" or "amazing" is in the voice information, the "surprise" mode corresponds to the feeling, and "marks of protruding eyes due to surprise" are composed at the position where coordinates of the centers of the eye mark are (x2, y2) and (x3, y3), respectively. In addition, an "orientation determination result" in FIG. 6 indicates that an orientation of a person with respect to a camera is determined to be either in front, at the angle to the right or at the angle to the left by a pattern matching method or the like, and patterns with different orientations of protruding eyes depending on the determination result are composed.

In addition, in a case in which a keyword such as "cold" or "chilly" is in the voice information, the "sorrow" mode corresponds to the feeling, and a "shading (slanted lines) mark" is placed on a face and a "falling leaves mark" is composed around the face. In such a case, the color of the face may be white (pale) instead of placing slanted lines in the face. Moreover, more touch of sorrow may be added by changing the background to be monotone. In addition, other marks may be composed as follows. If there is a word such as "Mmm" or "well", a mode is determined to be the "worry (doubt)" mode and a "question mark" is composed. If there is a word such as "aah" or "love", a mode is determined to be the "love" mode and a "heart" is composed. If there is a word such as "yahoo" or "made it", a mode is determined to be the "pleasure" mode and a "fireworks" mark is composed. A certain number of these image processing patterns may be prepared on the system side and a customer may prepare and add data to the patterns. In this case, a word frequently used by the customer in a favorite phrase may be set as a word drawing a mode, or a composition image or a keyword for various feeling mode may be registered as the customer likes.

It is sufficient to set the above-mentioned image processing patterns once prior to respective image processing. The setting is performed with respect to a database on the lab side.

Then, in step 210, photographing information having voice data as accompanying information which is photographed by a digital camera or the like having a recording function is inputted form the photographing information inputting device 52. Voice data and image data in the inputted photographing information are sent to the image processing apparatus 54, respectively.

Then, in step 220, a type of feeling is specified from the voice data in the image processing apparatus 54. For this purpose, the voice data is recognized first and matching is performed to find if a keyword that draws a registered mode indicating a type of feeling is included in the voice data. If a specific keyword is detected from the voice data, a specific image processing pattern is specified by a mode corresponding to the keyword.

In the next step 230, a composition image of the image processing pattern specified above is composed on the photographed image.

In a case in which a composing position of the composition image to be composed on the photographed image is predetermined with respect to the photographed image in a specified position such as any of four corners including right upper corner, and in which a specified size or relative size of the composition image is predetermined with respect to a size of the photographed image, the composition image is composed on the photographed image in the predetermined composing position and in the predetermined size.

When the composing position and the composing size of the composition image to be composed on the photographed image is predetermined with respect to a person or his or her face in the photographed image in a fixed or relative manner, the person or the face is preferably extracted from the photographed image by a publicly known method in advance. As a method of extracting a face, there is, for example, a method disclosed in Japanese Patent Application Laid-open No. Hei 8-122944 by the applicant of this application. Further, as a device for extracting a specific region such as a face region of a person, a method disclosed in each of Japanese Patent Application Laid-open No. Hei 4-346333, 5-158164, 5-165120, 6-160993, 8-184925, 9-101579, 9-138470, 9-138471, 9-146194 and 9-197575 is preferably available in addition to the above-mentioned methods.

When a face of a person is extracted form the photographed image, eyes are extracted from the face, and the width of the face, the positions of the eyes and the like are calculated. Then, based on the data, a composition image is composed in accordance with a composing position, a composing size and an orientation designated in the image processing pattern.

In addition, if there are other designations such as to change a density or a color of the background or the entire screen, processing of such a designation is performed. Thereafter, normal image processing is performed and an output image is prepared.

Determination of a type of feeling of a person (face) in the photographed image is not limited to the one depending on voice data as described above, but the type of feeling may be determined by using an expression or a gesture of the person, which will be described later in detail.

Further, in determining a type of feeling only from voice data as described above, it is unnecessary to extract a person from the photographed image. On the other hand, if a type of feeling is determined from an expression or a gesture of a person or from voice data and an expression or a gesture of a person, it is necessary to extract a person from the image.

In addition, although it is unnecessary to extract a person from the image for determination of a feeling, the person is preferably extracted when composing an image processing pattern, since the image processing pattern is preferably composed with respect to the person or his or her face. However, if the image processing pattern is composed in a specified position in the photographed image, or if a background is changed or a density or a color of the entire screen is changed, or if falling leaves are flown without regard to a position, it is unnecessary to extract a person specifically. In this way, extraction of a person out of an image may be performed if necessary. In addition, it is therefore preferable to make it possible to select and set a determining method or the like of a type of feeling in advance. Lastly, in step 240, the output image is outputted from the image recording apparatus 16.

Further, in the example described above, the lab side, which has received a request of a customer who performed photographing by a digital camera or the like, performs image processing by a printer in the lab and prepares a print on which a mark emphasizing a feeling is composed. However, the above-mentioned image processing may be performed on the digital camera side. If the processing is performed on the digital camera side, image processing patterns or the like are set on the camera side in advance.

In addition, the above-mentioned processing may be entirely performed automatically based on voice data recognition and extraction of a face from the photographed image, or an operator may input by operation keys or the like and perform the processing in accordance with an instruction of a customer.

Also when the processing is performed on the digital camera side, image composition processing may be performed automatically by incorporating software for executing the above-mentioned image processing in the digital camera, or a customer may instruct a camera by keys/buttons or the like to perform the composition processing at the time of photographing.

In addition, image processing by the above-mentioned image processing patterns may be applied to an index print while a main print is normally processed.

In addition, although an image (mark) emphasizing a feeling is composed in this embodiment, an expression may be changed by image modification processing including morphing processing so as to correspond to a type of feeling. For example, in a case of "anger", the image modification processing including the morphing processing can be performed to slant eyes upwardly. However, in order to enhance amusement aspect of a photograph, a somewhat comical expression as in the example shown in FIG. 6 has more fun and is effective than a change to a too real expression.

Further, instead of composition corresponding to a person in a photographed image as described above, the person per se or portions constituting the person such as face and body per se may be entirely subjected to processing for substituting with an animation image or a computer graphics (CG) image, and in particular an animation image or a CG image corresponding to a type of feeling.

The animation image or CG image used may be one image determined in accordance with the type of feeling, but a plurality of patterns can be preferably selected for each of a still image and an animation image.

The animation image and CG image as described above may include a content prepared and registered in advance by a customer, or a content supplied by a company managing a repeater station as described later.

As in the above case, conversion patterns can be preferably set based on at least one kind of information selected from an expression and a gesture of a subject person in a photographed image, and voice contents. It goes without saying that a request from a customer can be more preferably registered.

The processing as described above enables remarkable enhancement of amusement aspect in image expression in a photograph, a video, a TV telephone and the like. Further, this method is convenient and does not offend an opposite party when one does not want to display his or her face in a TV telephone or the like.

A second embodiment of the second aspect of the present invention will now be described.

The second embodiment is an application of the image processing method of the second aspect of the present invention to an animation such as that in a cellular TV telephone or a movie editing rather than to a still image such as a photograph.

In a case of an image displayed on a display screen of a cellular TV telephone or an animation such as a displayed image of a movie, an image processing method itself is basically the same as that in the above-mentioned first embodiment.

That is, the same image processing patterns as above are registered and image processing software is also incorporated in a microcomputer such as a cellular TV telephone terminal or the like in advance. Then, in a case of a cellular TV telephone, if a registered keyword is detected in conversation during a call, processing for composing a composition image of a mode corresponding to the keyword is performed in the terminal. Then, the composition image is transmitted to a terminal of the other party of the call and displayed.

In this case, it is more effective if the displayed image itself is also an animation, and a composed "sweat mark", for example, as shown in FIG. 6 does not be at a standstill but, for example, flows downward little by little.

Further, by securing a sufficient operation speed of a CPU, it also becomes possible to perform image processing on a real time basis while reproducing an image during a call by a cellular TV telephone or during a movie edition A third embodiment of the second aspect of the present invention will now be described.

This embodiment also relates to an apparatus for performing image processing on a real time basis such as a TV telephone (or a cellular TV telephone). That is, this embodiment is to determine a type of feeling using expression recognition or gesture recognition instead of voice data as accompanying information for determining a type of feeling of a person.

For expression recognition, a table associating images of expressions of emotions such as pleasure, anger, sorrow and joy with modes corresponding to the expressions is registered for each individual in a cellular TV phone terminal of each person in advance. In addition, for gesture recognition, a table associating gestures determined by each person with modes, in such ways as raising one finger means this mode and raising two fingers means that mode, is registered in a cellular TV telephone terminal of each person in advance.

Then, during a call, a face is extracted from a photographed image of a caller and a type of expression is identified by the pattern matching in the cellular TV telephone terminal. If an expression that coincides with a specific expression registered in advance is detected, image processing of an image processing pattern of a mode corresponding to the registered expression is performed, and a processed image is sent to a terminal of the other party of the call and displayed. Alternatively, similar processing is performed if it is detected that the caller gestures in a specific way by the gesture recognition.

Further, as examples of a publicly known technology concerning expression recognition and gesture recognition, there are, for example, the technical research report dated November 18 and 19, 1999 of the Institute of Electronics, Information and Communication Engineers, PRMU99-106 "Gesture Recognition robust to Variations of a Position of Operation" Taiko Amada, Motoyuki Suzuki, Hideaki Goto, Shozo Makino (Tohoku University), PRMU99-138 "Automatic Extraction of Face Organ Outline and Automation of Expression Recognition" Hiroshi Kobayashi, Hisanori Takahasi, Kosei Kikuchi (Science University of Tokyo), PRMU99-139 "Estimation of Face Region and Expression Recognition using Potential Net" Hiroaki Bessho (Image Information Science Center), Yoshio Iwai, Masahiko Taniuchida (Osaka University), PRMU99-140 (Special Lecture) "Research on Face Expression Recognition and Image Processing Technology" Hiroshi Yamada (Nippon University/AIR), PRMU99-142 (Special Invitation Thesis) "Analysis and Recognition of Personal Movement for Interaction" Masahiko Taniuchida, Yoshio Iwai (Osaka University), which are preferably applicable to the present invention.

A fourth embodiment of the second aspect of the present invention will now be described.

Figure 7:
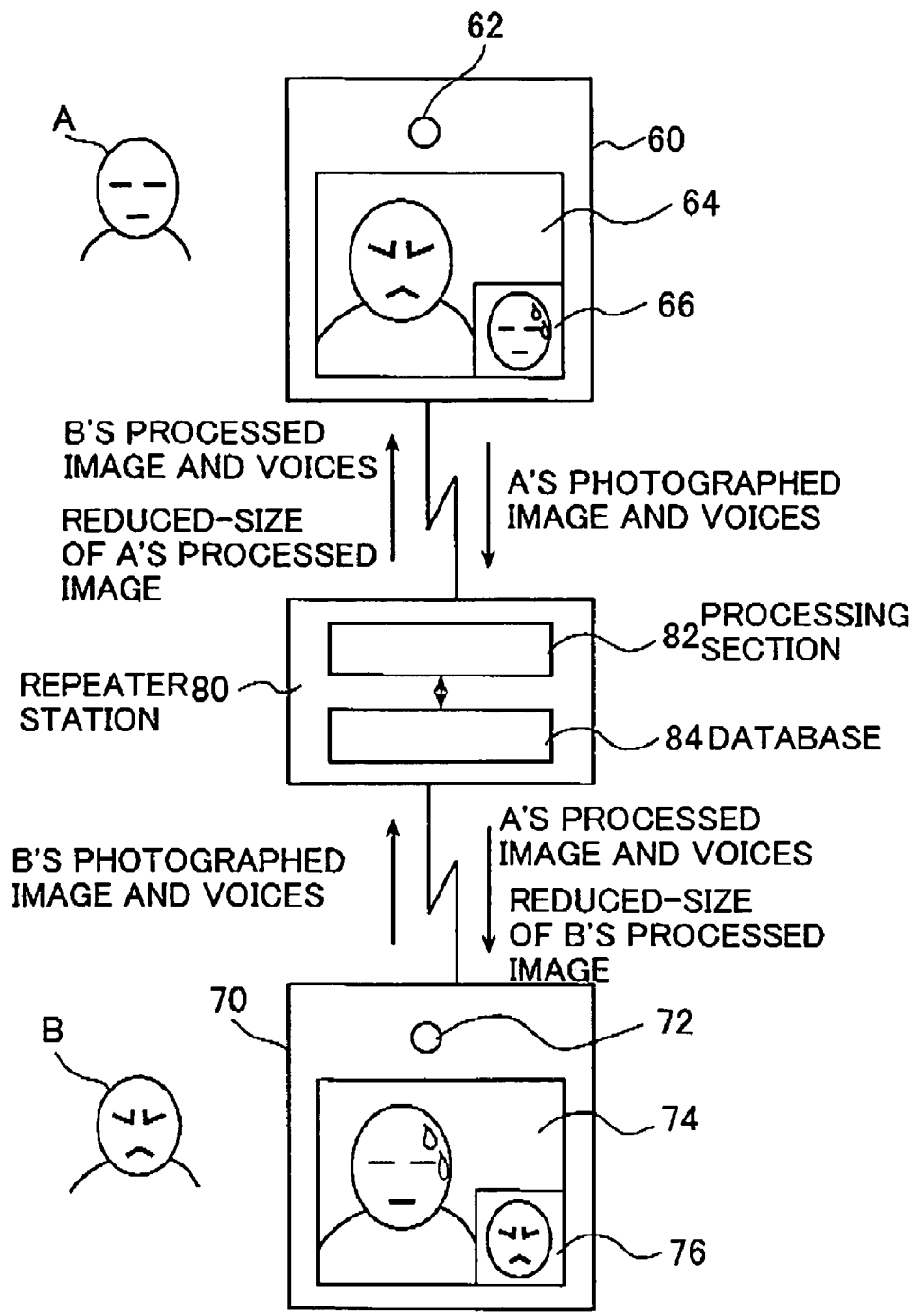
FIG. 7 is an explanatory illustration schematically showing a cellular TV telephone system in accordance with a fourth embodiment of the second aspect of the present invention.

This embodiment is to perform image composition processing on a repeater station side of the TV telephone, although it also relates to a TV telephone or a cellular TV telephone. A cellular TV telephone system in this embodiment is schematically shown in FIG. 7. Face image data (an expression of each mode for determining a mode corresponding to a type of feeling) and voice data (a keyword for drawing each mode) for each user as well as image composition patterns in each mode are registered in a database 84 of a repeater station 80 of a communication provider through cellular TV telephone terminals 60 and 70.

During communication, a photographed image of A photographed by an image sensor 62 and voices of A and a photographed image of B photographed by an image sensor 72 and voices of B are transmitted to the repeater station 80 from the A's cellular TV telephone terminal 60 and the B's cellular TV telephone terminal 70, respectively, as shown in FIG. 7.

In a processing section 82 of the repeater station 80, faces are always extracted from the photographed images of A and B, which are matched with the registered expressions, and at the same time, it is checked if registered keywords are heard in the voices in the call.

Then, for example, if the fret mode is detected in the conversation of A, processing for composing, for example, a sweat mark is applied to the photographed image of A, and the processed image is transmitted to the B's terminal 70. In addition, at this point, a reduced-size image of the processed image of A may be transmitted to the A's terminal 60 for confirmation. The face image of B is displayed on a display screen 64 of the A's terminal 60, while the processed image of A is displayed on a display frame 66 that is provided at the corner of the display screen 64 for confirmation of the processed image of A. At this point, the processed image of A is similarly displayed on a display screen 74 of the B's terminal 70 and, at the same time, a reduced-size processed image of B transmitted from the repeater station 80 is displayed on a display frame 76 for confirmation at the corner of the display screen 74.

Further, face image data, voice data, image composition patterns and the like of each user may be registered in a terminal of a user to perform the process from the mode detection to the image composition processing on the cellular TV telephone terminal side. In addition, the above-mentioned data may be registered in both the repeater station and the terminal such that the processing can be performed in either of them.

In addition, the image composition processing may be applied not only to voice and image data to be transmitted but also to received voice and image data. For example, in FIG. 7, the composition processing with respect to an image received from B may be performed in the A's terminal. In this case, amusement aspect is enhanced by adding a pattern that the receiver A desires.

A fifth embodiment of the second aspect of the present invention will now be described.

This embodiment is to correct a position of a composition pattern if a misregistration occurs when the image composition processing is performed on a real time basis.

Since most of misregistrations of a composition pattern are due to a failure in extracting a face, if a misregistration of a composition pattern is found on a display screen, a face in the photographed image is designated by an electronic pen or the like. At this point, the outline of the face may be circled using the electronic pen, or the eyes may be connected by a line. Moreover, a position of the mouth or the like may be designated. Alternatively, a position to which the composition pattern should be shifted in parallel, an adjustment amount of a size or the like may be designated by key operation Thereafter, based on the corrected position and size of the composition pattern, a face position candidate area is automatically corrected to coincide with an original composition pattern, and the face extraction processing is executed again. Thus, a position and a size of a composition pattern is corrected in accordance with a movement of a face on a real time basis even in a case of an animation as in a cellular TV telephone. Therefore, since a composition pattern automatically follows a face and is displayed at a predetermined position in a displayed image, amusement aspect of an image display in an image displaying medium is enhanced.

In addition, the image processing method according to the third aspect of the present invention applies the image processing method according to the second aspect of the present invention as described above to a TV image captured in a personal computer. Specifically, the TV image is captured in the personal computer and subjected to composition processing, substitution processing, image modification processing and color/density modification processing as described above. Alternatively, a digital TV may have a receiver including the above-mentioned composition processing function and other functions so that a customer can further set composition patterns. Amusement aspect can be thus enhanced still more.

The image processing methods according to the second and third aspects of the present invention are basically configured as described above.

An image processing method in accordance with a fourth aspect of the present invention will now be described with reference to FIGS. 8 and 9.

The image processing method in accordance with a fourth aspect of the present invention is basically to register in advance an area image in a specific area of a photographed image or an image characteristic amount and to compose on a corresponding area of the photographed image or adjust a density and a color tone by using the area image or image characteristic amount registered in advance.

For example, in the image processing method of this aspect, reference face images are registered in advance as face images of a subject person in a photographed image and include an image of a preferred made-up face of the person, an image of a favorite face of the person and image characteristic amounts thereof, and a face image in a full-faced state in which a photographing direction is coincident with a line of sight. When the person is a subject of the photographed image, the face of the person in the photographed image is corrected, composed or converted to the reference face images registered in advance including the image of the preferred made-up face of the person, the image of the favorite face of the person, and the face image in a full-faced state in which the photographing direction is coincident with the line of sight. Alternatively, the image characteristic amounts registered in advance are employed to correct or adjust density or color tone of the face so that the finished face image has the preferred made-up face or favorite face of the person. Thus, anyone can easily correct the face image to the reference face images such as the image of the preferred made-up face, the image of the favorite face and the like, and unnatural feeling due to noncoincidence of the line of sight can be removed.

A case in which a face image of a subject person in a photographed image is corrected to an image having a preferred made-up face or favorite face or a face image in a full-faced state in which a photographing direction is coincident with a line of sight will be described below as a typical example. However, this is not the sole case of this aspect.

Further, as in the second and third aspects of the present invention, objects to which the fourth aspect of the present invention is applied range widely from a photograph (still image) to real time image display such as a video (animation) and a TV telephone, or the like.

A first embodiment of the fourth aspect of the present invention will be described first.

The first embodiment is for applying predetermined image processing to an image photographed with a digital camera or the like by using registration patterns registered in advance.

Figure 8:
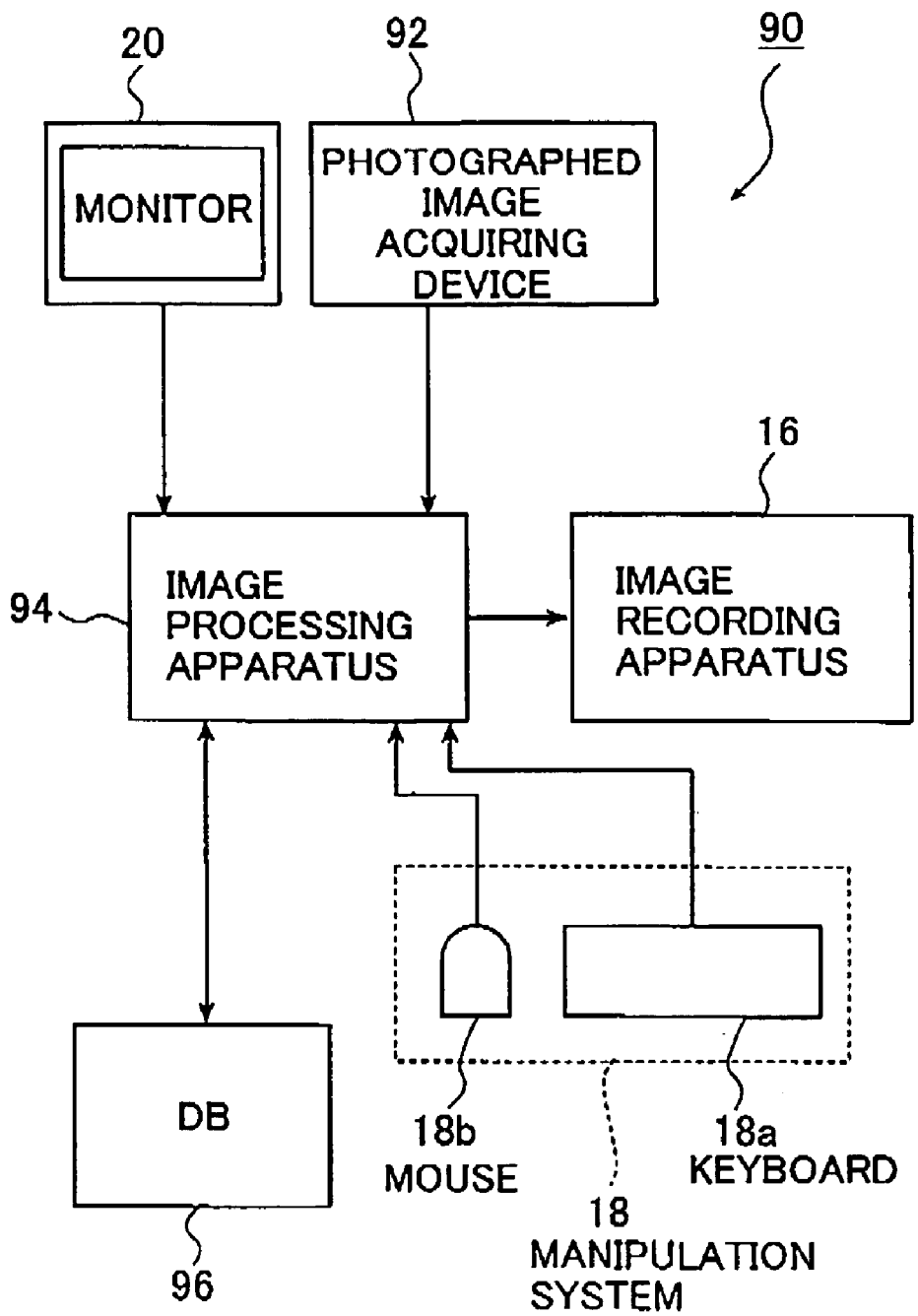
FIG. 8 is a block diagram schematically showing an example of a digital photoprinter including an image processing apparatus implementing an image processing method in accordance with a fourth aspect of the present invention.

FIG. 8 is a block diagram schematically showing a digital photoprinter including an image processing apparatus that implements the image processing method in accordance with the first embodiment of the fourth aspect of the present invention. A digital photoprinter 90 shown in FIG. 8 mainly includes a photographed image acquiring device 92, an image processing apparatus 94, a database 96 and an image recording apparatus 16. Basically, the image recording apparatus 16, the operation system 18 and the monitor 20 similar to those in the photoprinter 50 shown in FIG. 4 can be used.

The photographed image acquiring device 92 is to read photographing image data from a recording medium in which the image data are recorded by an image photographing device such as a digital camera. The image processing apparatus 94 implements the image processing method in accordance with this aspect of the present invention and other various kinds of image processing. More specifically, the image processing apparatus 94 acquires, extracts or prepares reference face images to be registered in advance in the database 96 from the photographing image data captured by the photographed image acquiring device 92; selects any of the reference face images registered in advance in the database 96; and corrects, composes or converts the face image in the photographed image by using the selected reference face image. The database 96 is used to register in advance the reference face images including an image of a preferred made-up face of the subject person in the photographed image, an image of a favorite face of the person and image characteristic amounts thereof, and a face image in a full-faced state in which a photographing direction is coincident with a line of sight (hereinafter also referred to as "face image in which line of sight is toward camera". Other functions of the image processing apparatus 94 and functions of the operation system 18 including the keyboard 18a and the mouse 18b, the monitor 20, and the image recording apparatus 16 are basically the same as those in the digital photoprinter 50 shown in FIG. 4. Therefore, the description will be omitted.

Image processing of the first embodiment will be hereinafter described with reference to a flow chart of FIG. 9.

First, in step 300, a face is photographed in advance in the most preferable situation by a photographing device such as a digital camera and the photographed image of the face is acquired as a photographed image for registration in the photographed image acquiring device 92.

Then, in step 310, a face extraction algorithm is applied in the image processing apparatus 94 to extract a face region for a reference face image from the photographed face image acquired by the photographed image acquiring device 92. Image characteristic amounts of the reference face image may be calculated in this process. It should be noted that calculation of the image characteristic amounts of the reference face image and hence the extracting process in step 310 may be omitted when the whole of the photographed face image is used as the reference face image. When omitted in step 310, calculation of the image characteristic amounts of the reference face image may be performed in the preceding step 300, subsequent step 320 or step 360 for correction process to be described later.

In step 320, the whole of the photographed face image or the face region extracted therefrom is registered in the database 96 as the reference face image. Pre-processing is thus finished.

For the reference face images to be registered in the database 96, any type of faces including a neatly made-up face, a face with hair set in a beauty salon or barbershop, a shaven face and a face with mustache set may be used. A plurality of reference face images prepared for a specific person may be changed in use for example between morning and night, for each season or for each party in the case of displaying in a TV telephone or a cellular telephone.

Each portion constituting the face image may be registered as the reference pattern in the reference face image. Namely, in the extracting process in step 310, an area which it is desired to use for correction or composition may be automatically extracted or manually designated to register the thus extracted or designated area as the reference pattern. Examples of the reference pattern include respective portions constituting the face such as eyes, eyebrows, cheeks, lips, nose, ears, hair, and mustache, and accessories such as earrings, a hat (bandanna and headband also included) and glasses (sunglasses also included).

In this case, it is more preferable that the face extraction algorithm can be applied to automatically recognize which portion of the face the designated area indicates. When the accuracy in face extraction is low, area setting is performed while designating the respective portions one by one.

Then, in step 330, the photographed image is acquired by the photographed image acquiring device 92. The process of acquiring the photographed image in step 330 precedes for example transmission or display of the photographed image to ox on the monitor screen of a TV telephone or a cellular telephone. Thus, in the communication with such a telephone, an owner or an exclusive user of the TV telephone or the cellular telephone is very often a subject person in the photographed image. The subject person is specified in many cases. Therefore, it is preferable that information such as ID can be automatically acquired. Further, when there are many users, each user is given an ID so that the ID of a subject person can be acquired in step 330 together with the photographed image by the photographed image acquiring device 92.

Then, in step 340, the image processing apparatus 94 applies the face extraction algorithm to the photographed image acquired by the photographed image acquiring device 92 to extract the face region of the subject person from the photographed image as the face image. In this process, it is preferable that not only the entire face region but also the respective portions constituting the face image are determined.

For example, the contour of the face is first extracted, followed by area restriction of the respective portions, after which the areas of the respective portions can be determined finally by means of configuration pattern matching.

If the accuracy in face extraction is low, it is preferable that, when photographing is started with a photographing device such as a digital camera, the subject person takes a posture so that the face of the subject person comes to (or is located in) the position within a guide such as a face frame displayed on a viewfinder or display device. Extraction of the face image by means of the configuration pattern matching is thus facilitated, and once having been caught, the face of the subject can be followed by means of local matching between photographing frames even in a different photographing frame.

In step 350, a registered reference face image of a person that the image processing apparatus 94 searched or specified from the database 96 based on the above-mentioned ID or the like, a reference pattern and optionally image characteristic amounts thereof are selected and called. It is also possible to have new combinations by selecting from different reference images for the respective portions of the face image of the specific person as described above. For example, a newly combined face image including a first reference face image for eyes, a third reference face image for eyebrows and an eighth reference face image for earrings can be also made.

Either of steps 340 and 350 may be preceded or both may be performed simultaneously.

Then, in step 360, the face image extracted in step 340 and the areas of the respective portions constituting the face image are corrected, composed or substituted by using the registered reference face image for the specific person, reference pattern and their image characteristic amounts selected in step 350. The registered reference face image may be composed on or substituted for the entire face image, or a registered reference pattern image may be used for each portion of the face to perform correction, composition or substitution. Alternatively, image characteristic amounts of registered reference pattern images may be used to perform correction.

For example, cheeks and lips are corrected to have a color tone of the reference pattern of the corresponding portions. In particular, lips move and hence, only the color tone of lips is preferably corrected after the lip area is separated from the skin area in color tone on a pixel basis.

As for hair, eyebrows, cheeks, ears (earlobes), reference patterns are preferably overwritten for composition. In this case, a portion surrounding the composition area is preferably smoothed to have a blurred boundary.

Finally, in step 370, the photographed image in which the face image is corrected in step 360 is outputted from the image processing apparatus 94 as an output image. The output image may be outputted from the printer 16 as a photographic print or displayed on the monitor 20, or outputted to a TV telephone or cellular telephone terminal (more specifically its image processor; see FIG. 7) so as to transmit to a TV telephone or cellular telephone terminal (more specifically its image processor; see FIG. 7) on an opposite party side for displaying on a display screen. Alternatively, one may directly transmit the photographed image to the opposite party side to display on the display screen, or of course display on a display screen of his or her apparatus.

Even inexperienced or unskilled persons in personal computer or image processing software can easily correct images so as to have a preferred made-up face or a favorite face.

In addition, a clothing portion (area set under the face) or a background (region other than the face area) of the subject person may be enchased with decoration patterns so that intimate apparel and night clothes including pajamas or interior of a room can be hidden without giving unpleasant feeling to others.

Then, a second embodiment of the fourth aspect of the present invention will be described.

The second embodiment is for applying predetermined image processing to an image photographed with a digital camera or the like by using registration patterns registered in advance as in the first embodiment, but is different from the first embodiment in that the registration pattern registered in advance is a face image in which a photographing direction is coincident with a line of sight of a subject person (face image in which line of sight is toward camera). Therefore, the second embodiment will be also described below with reference to FIGS. 8 and 9.

According to the second embodiment, in step 300 shown in FIG. 9, a photographed image is taken with a photographing device such as a digital camera in a state in which a subject looks at the camera, and then recorded. The recorded photographed image is acquired by the photographed image acquiring device 92 (see FIG. 8) as a photographed image for registration.

Then, in step 310, the image processing apparatus 94 applies the face extraction algorithm to the photographed image for registration acquired by the photographed image acquiring device 92 to extract an area of eyes as a reference pattern. In step 320, the thus extracted area of eyes is registered in the database 96 as a reference pattern. Pre-processing is thus finished.

Then, in step 330, the photographed image is acquired by the photographed image acquiring device 92. The process of acquiring the photographed image in step 330 precedes for example transmission or display of the photographed image to or on the monitor screen of a TV telephone or a cellular telephone.

Then, in step 340, in the communication with such a telephone, the image processing apparatus 94 applies the face extraction algorithm to the photographed image acquired by the photographed image acquiring device 92 to extract the area of eyes of the subject person from the photographed image.

In step 350, the image processing apparatus 94 selects and calls a registered reference pattern from the database 96. Either of steps 340 and 350 may be preceded or both may be performed simultaneously.

Then, in step 360, the area of eyes extracted in step 340 is corrected, composed or substituted by using the registered reference pattern selected in step 350. When movement between image frames is small or when the image can be considered to be in a full-faced state (as a result of balance check between left side and right side), the registered reference pattern image may be used as such for composition.

Finally, in step 370, a photographed image in which eyes have been corrected in step 360 so as to look at the camera is outputted from the image processing apparatus 94 as an output image. Alternatively, in a TV telephone or a cellular telephone terminal, a stationary state of the photographed image (for example a state of an image photographed on startup in which a subject is correctly postured and looking at a monitor) is temporarily stored. When the difference between the temporarily stored image and the actual image exceeds a specified value, the photographed image can be transmitted as it is in order to prevent unnatural feeling due to the large movement.

The output image may be outputted from the printer 16 as a photographic print or displayed on the monitor 20, or outputted to a TV telephone or cellular telephone terminal so as to transmit to a TV telephone or cellular telephone terminal on an opposite party side for displaying on a display screen. Alternatively, the photographed image may be directly transmitted to the opposite party side to display on the display screen.

Unnatural feeling due to noncoincidence of the line of sight can be thus removed.

In addition, when a reference pattern is registered, an animation of a photographed image in which a subject looks at a camera, for example a photographed animation in which a subject winks at least once is recorded. As for composition during the communication with a TV telephone or the like, composition can be made as an animation irrespective of the actual timing of winking. Alternatively, when a photographed image is acquired, winking detection may be performed for synchronization, which is more preferable.

In addition, in a third embodiment of the fourth aspect of the present invention, if a transmission terminal such as a TV telephone or cellular telephone terminal (see FIG. 7) has a high arithmetic capability, various types of correction processing as described in the first and second embodiments of this aspect can be executed in the transmission terminal. Alternatively, a reference face image and decoration pattern data may be registered in the repeater station (see FIG. 7) in combination with a customer ID and executed in the repeater station.

When family members use a TV telephone, a cellular telephone terminal or the like in the aspect under consideration, it is preferable to register a reference face image and a reference pattern for each family member as in the first aspect as described above.

The image processing method of the fourth aspect of the present invention is basically configured as described above.

As described above in detail, according to the first aspect of the present invention, an output image on which individual preference of each customer is reflected can be automatically obtained and amusement aspect of photography can be enhanced.

In addition, as described above in detail, according to the second aspect of the present invention, since a content that is desired to be emphasized according to a feeling is automatically visualized and represented in the display of, in particular, a face of a person in an image, amusement aspect in image representation such as a photograph, a video, a TV telephone or the like can be significantly enhanced. In addition, the automatic visualization is convenient and does not offend an opposite party when one does not want to display his or her face in a TV telephone.

As also described above in detail, the present invention overcomes the above-mentioned prior art problems so that even inexperienced or unskilled persons in personal computer or image processing software can easily correct images so as to have a preferred made-up face or a favorite face and remove unnatural feeling due to noncoincidence of the line of sight.

Thus, it is seen that an image processing method is provided. One skilled in the art will appreciate that the present invention can be practiced by other than the preferred embodiments which are presented for the purposes of illustration and not of limitation, and the present invention is limited only by the claims which follow.

What is claimed is:

1. An image processing method for applying image processing to an inputted image data, comprising the steps of:
registering predetermined image processing conditions for each specific person in advance;
extracting a person in said inputted image data;
identifying the extracted person to find if the extracted person is the specific person; and
selecting image processing conditions corresponding to said identified specific person to perform the image processing based on said selected image processing conditions, wherein it is set whether said image processing under said selected image processing conditions is applied to an image as a whole or applied only to the person or the person and a vicinity of the person.

2. The image processing method according to claim 1, wherein the extracted person is identified using a face image of said specific person registered in advance or person designation information accompanying a photographed frame.

3. The image processing method according to claim 1, wherein a plurality of kinds of image processing conditions are set for said each specific person as said predetermined image processing conditions to be registered for said each specific person in advance.

4. The image processing method according to claim 3, wherein said image processing is performed by using at least one image processing condition selected from said plurality of kinds of image processing conditions.

5. The image processing method according to claim 1, wherein said inputted image data is image data of an image and said image processing under said selected image processing conditions is applied to said image data of said image.

6. The image processing method according to claim 1, wherein the image processing conditions comprises at least one of adjustment of density of a body part, adjustment of tint of a body part, and slim body finish.

7. The image processing method according to claim 1, wherein the image processing conditions comprises at least one of adjustment of density of a body part, adjustment of tint of a body part, slim body finish, filtering, soft focus finish, and image composition.

8. The image processing method according to claim 1, wherein the image processing conditions are unique to each specific person.

9. The image processing method according to claim 1, wherein the step of registering predetermined image processing conditions for each specific person in advance comprises:
storing a plurality of extraction information corresponding to a plurality of persons, wherein each one of the plurality of extraction information uniquely correspond to one of the plurality of persons.

* * * * *